United States Patent
Kim et al.

(10) Patent No.: US 12,524,322 B2
(45) Date of Patent: Jan. 13, 2026

(54) SYSTEM, METHOD, AND COMPUTER-READABLE STORAGE MEDIUM FOR SYSTEM-ON-CHIP VERIFICATION

(71) Applicant: Samsung Electronics Co., Ltd., Suwon-si (KR)

(72) Inventors: Namyoung Kim, Suwon-si (KR); Hyeonman Park, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 41 days.

(21) Appl. No.: 18/436,335

(22) Filed: Feb. 8, 2024

(65) Prior Publication Data

US 2024/0272999 A1 Aug. 15, 2024

(30) Foreign Application Priority Data

Feb. 13, 2023 (KR) .................. 10-2023-0018861

(51) Int. Cl.
*G06F 11/263* (2006.01)
*G06F 11/22* (2006.01)

(52) U.S. Cl.
CPC ........ *G06F 11/263* (2013.01); *G06F 11/2273* (2013.01)

(58) Field of Classification Search
CPC .............. G06F 11/263; G06F 11/2273; G06F 11/2236; G06F 11/2257; G06F 11/261; G06F 11/273
USPC ........................................................ 714/738
See application file for complete search history.

(56) References Cited

U.S. PATENT DOCUMENTS

| | | | |
|---|---|---|---|
| 10,733,088 B1 * | 8/2020 | Sommers | G06F 11/3688 |
| 10,937,203 B1 | 3/2021 | Pal et al. | |
| 11,062,073 B2 | 7/2021 | Jeffrey et al. | |
| 11,200,129 B2 * | 12/2021 | Carrington | G06F 11/3409 |
| 11,226,370 B1 * | 1/2022 | Mendelson | G06F 11/3688 |
| 11,263,381 B1 | 3/2022 | Lawson et al. | |
| 2016/0048437 A1 * | 2/2016 | Shukla | G06F 11/263 714/33 |
| 2020/0401504 A1 * | 12/2020 | Sommers | G06F 11/3688 |
| 2021/0406442 A1 | 12/2021 | Mao et al. | |
| 2022/0137125 A1 * | 5/2022 | Huang | G01R 31/31707 714/735 |
| 2022/0292248 A1 | 9/2022 | Yang et al. | |

FOREIGN PATENT DOCUMENTS

KR 10-2417677 B1 7/2022

* cited by examiner

*Primary Examiner* — James C Kerveros
(74) *Attorney, Agent, or Firm* — Harness, Dickey & Pierce, P.L.C.

(57) ABSTRACT

A system for verifying a system-on-chip (SoC) including a plurality of intellectual property cores (IPs) includes a library configured to store a plurality of sequence codes corresponding to the plurality of IPs and a plurality of task codes for driving the SoC, and processing circuitry configured to, generate at least one test scenario by combining one or more of the sequence codes and one or more of the task codes stored in the library, generate metadata based on the at least one test scenario, the metadata having a specific format, and generate universal verification methodology (UVM) test code based on the metadata.

20 Claims, 17 Drawing Sheets

Metadata form of test scenario

SYSTEM, METHOD, AND COMPUTER-READABLE STORAGE MEDIUM FOR SYSTEM-ON-CHIP VERIFICATION

CROSS-REFERENCE TO RELATED APPLICATION

This U.S. non-provisional application claims the benefit of priority under 35 U.S.C. § 119 to Korean Patent Application No. 10-2023-0018861, filed on Feb. 13, 2023, in the Korean Intellectual Property Office, the disclosure of which is incorporated by reference herein in its entirety.

BACKGROUND

Various example embodiments of the inventive concepts relate to a system, a method, and/or a non-transitory computer-readable storage medium for system-on-chip (SoC) verification, etc., and more particularly, to a system, a method, and/or a non-transitory computer-readable storage medium, etc., for automatically generating universal verification methodology (UVM) test code for verifying an SoC.

Application-specific integrated circuit (ASIC) technology has evolved from a chip-set system in which a plurality of functional blocks are configured and/or implemented as a plurality of individual chips to an SoC that is a system in which a plurality of functional blocks are embedded and/or integrated into a single semiconductor device. An integrated circuit of the SoC may include various functional blocks, such as a microprocessor, an interface, a memory array, and/or a digital signal processor (DSP), etc. There is a desire and/or need for verifying whether the functional blocks included in the SoC operate normally.

SUMMARY

Various example embodiments of the inventive concepts provide a method, a system, and/or a non-transitory computer readable medium for easily and quickly generating a complex test scenario capable of increasing verification reliability, wherein the test scenario may be generated as universal verification methodology (UVM) test code.

Various example embodiments of the inventive concepts provide a method, system, and/or a non-transitory computer readable medium for automatically generating UVM test code.

According to at least one example embodiment of the inventive concepts, there is provided a system for verifying a system-on-chip (SoC) including a plurality of intellectual property cores (IPs), the system including a library configured to store a plurality of sequence codes corresponding to the plurality of IPs and a plurality of task codes for driving the SoC, and processing circuitry configured to, generate at least one test scenario by combining one or more of the sequence codes and one or more of the task codes stored in the library, generate metadata based on the at least one test scenario, the metadata having a specific format, and generate universal verification methodology (UVM) test code based on the metadata.

According to at least one example embodiment of the inventive concepts, there is provided a method, performed by at least one processor by executing a program, of verifying a SoC, the method including generating at least one test scenario by combining one or more sequence codes of a plurality of sequence codes and one or more task codes of a plurality of task codes, the plurality of sequence codes related to a plurality of intellectual property cores (IPs) included in the SoC, and the plurality of task codes associated with operation of the SoC, forming metadata based on the test scenario by applying a desired syntax to the at least one test scenario, generating universal verification methodology (UVM) test code based on the metadata, and outputting the UVM test code.

According to at least one example embodiment of the inventive concepts, there is provided a non-transitory computer-readable storage medium having stored thereon computer readable instructions, wherein the computer readable instructions, when executed by at least one processor, causes the at least one processor to, generate at least one test scenario based on one or more sequence codes of a plurality of intellectual property cores (IPs) and one or more task codes of a plurality of task codes associated with operation of a system-on-chip (SoC), form metadata based on the at least one test scenario by applying a desired syntax, generate universal verification methodology (UVM) test code based on the metadata, and output the UVM test code.

BRIEF DESCRIPTION OF THE DRAWINGS

Various example embodiments will be more clearly understood from the following detailed description taken in conjunction with the accompanying drawings in which.

DETAILED DESCRIPTION

Hereinafter, various example embodiments of the inventive concepts are described with reference to the accompanying drawings.

Figure 1A:
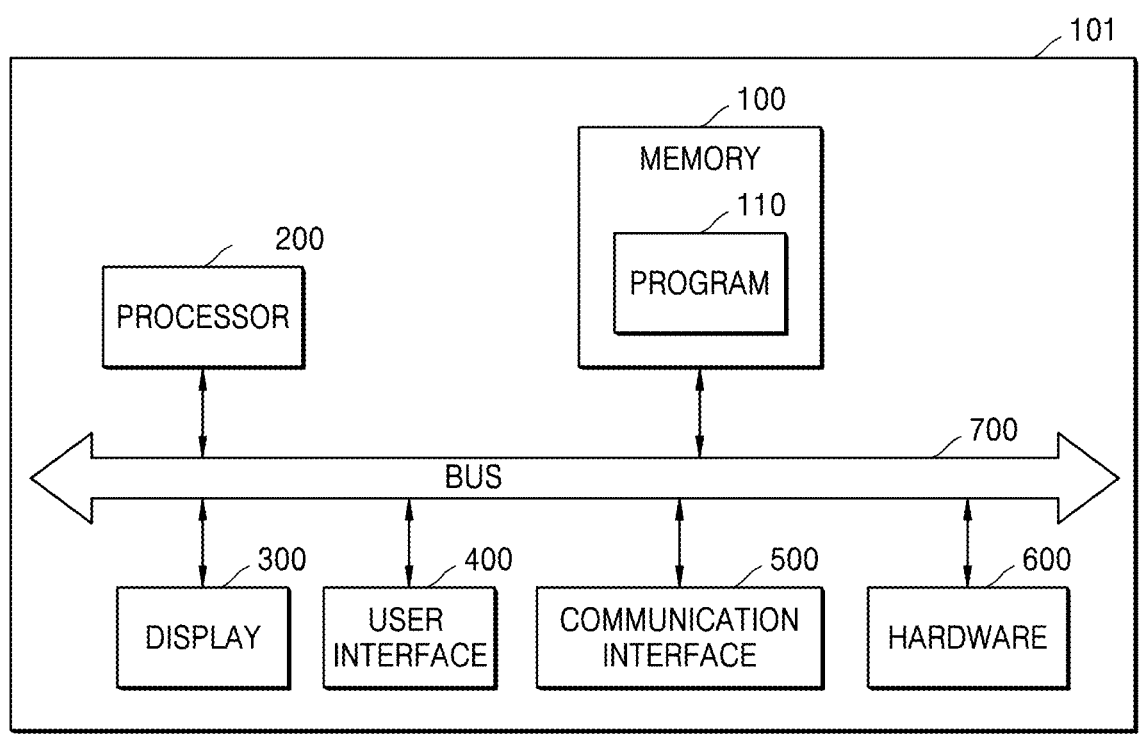
FIG. 1A is a block diagram illustrating an electronic device according to at least one example embodiment.

FIG. 1A is a block diagram illustrating an electronic device 101 according to at least one example embodiment.

The electronic device 101 may include a memory 100, at least one processor 200, a display 300, a user interface 400, a communication interface 500, hardware 600, and/or a bus 700, etc., but the example embodiments are not limited thereto, and for example, the electronic device 101 may include a greater or lesser number of constituent components. According to at least one example embodiment, the electronic device 101 may omit at least one of the above components, that is, the memory 100, the processor 200, the display 300, the user interface 400, the communication interface 500, the hardware 600, and/or the bus 700, or may additionally include other components. According to at least one example embodiment, the electronic device 101 of FIG. 1A may be a portable terminal, a smartphone, a tablet, a smart device, an Internet of Things (IoT) device, a computer, a server, etc. According to some example embodiments, one or more of the memory 100, the processor 200, the communication interface 500, the hardware 600, and/or the bus 700, etc., may be implemented as processing circuitry. Processing circuitry may include hardware or hardware circuit including logic circuits; a hardware/software combination such as a processor executing software and/or firmware; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc., but is not limited thereto.

The memory 100 may include a volatile memory and/or a non-volatile memory. The memory 100 may store, for example, computer readable instructions and/or data related to at least one other component in the electronic device 101, etc. According to at least one example embodiment, the memory 100 may store software and/or a program 110, etc. The program 110 may, for example, control and/or manage system resources (e.g., a bus, a processor, and/or a memory, etc.) used to execute an operation and/or a function implemented in other programs.

According to at least one example embodiment, the processor 200 according to at least one example embodiment of the inventive concepts may control the hardware 600 by executing the program 110 in the memory 100 and/or may perform verification of the processor 200. The processor 200 may include one or more of a central processing unit (CPU), an application processor (AP), and/or a communication processor (CP), etc. The processor 200 may, for example, perform operations and/or data processing related to controlling and/or communication of at least one other component, that is, the memory 100, the display 300, the user interface 400, the communication interface 500, the hardware 600, and/or the bus 700, etc., in the electronic device 101. The processor 200 may execute the program 110 in the memory 100 to control and/or verify the electronic device 101.

The display 300 may include, for example, a liquid crystal display (LCD), a light-emitting diode (LED) display, an organic light-emitting diode (OLED) display, a microelectromechanical systems (MEMS) display, and/or an electronic paper display, etc. The display 300 may display, for example, various contents (e.g., a text, an image, a video, an icon, and/or a symbol, etc.) to a user. The display 300 may include a touch screen and may receive a touch input, a gesture input, a proximity input, and/or a hovering input using, for example, an electronic pen or a body part of a user, but is not limited thereto.

The user interface 400 may serve as an interface through which commands and/or data input from, for example, a user and/or other external devices are transmitted to other component(s) in the electronic device 101. In addition, the user interface 400 may output commands and/or data received from other component(s) in the electronic device 101 to a user and/or other external devices, etc.

The communication interface 500 may establish communication between, for example, the electronic device 101 and an external device (not illustrated), but is not limited thereto. For example, the communication interface 500 may be connected to a network through wireless communication and/or wired communication to communicate with at least one external device (not illustrated), etc.

The wireless communication may be, for example, a cellular communication protocol, and may include, for example, at least one of 5G New Radio (NR), long-term evolution (LTE), LTE Advanced (LTE-A), code-division multiple access (CDMA), wideband CDMA (WCDMA), universal mobile telecommunications system (UMTS), wireless broadband (WiBro), and/or global system for mobile communications (GSM), etc., but the example embodiments are not limited thereto. In addition, the wireless communication may include, for example, short-range communication, etc. The short-range communication may include, for example, at least one of wireless fidelity (WiFi), Bluetooth, near-field communication (NFC), and/or global navigation satellite system (GNSS), etc.

The network may include at least one of telecommunications networks, for example, a computer network (e.g., a local area network (LAN) and/or a wide area network (WAN)), the Internet, and/or a telephone network, etc.

The hardware 600 may be, for example, a module capable of performing a specific function. According to at least one example embodiment, the hardware 600 may be a sensor module, but is not limited thereto. According to at least one example embodiment, the hardware 600 may be a module capable of performing an image processing function, etc. According to at least one example embodiment, the hardware 600 may be a power management module. Although FIG. 1 illustrates that only one piece of hardware 600 is provided in the electronic device 101, the number of pieces of hardware 600 is not limited thereto. A plurality of pieces of hardware 600 may be provided according to functions desired and/or required in the electronic device 101.

The bus 700 may connect, for example, the memory 100, the processor 200, the display 300, the user interface 400, the communication interface 500, and/or the hardware 600, to one another and may include a circuit that provides communication (e.g., control messages and/or data) between the memory 100, the processor 200, the display 300, the user interface 400, the communication interface 500, and/or the hardware 600, etc.

Figure 1B:
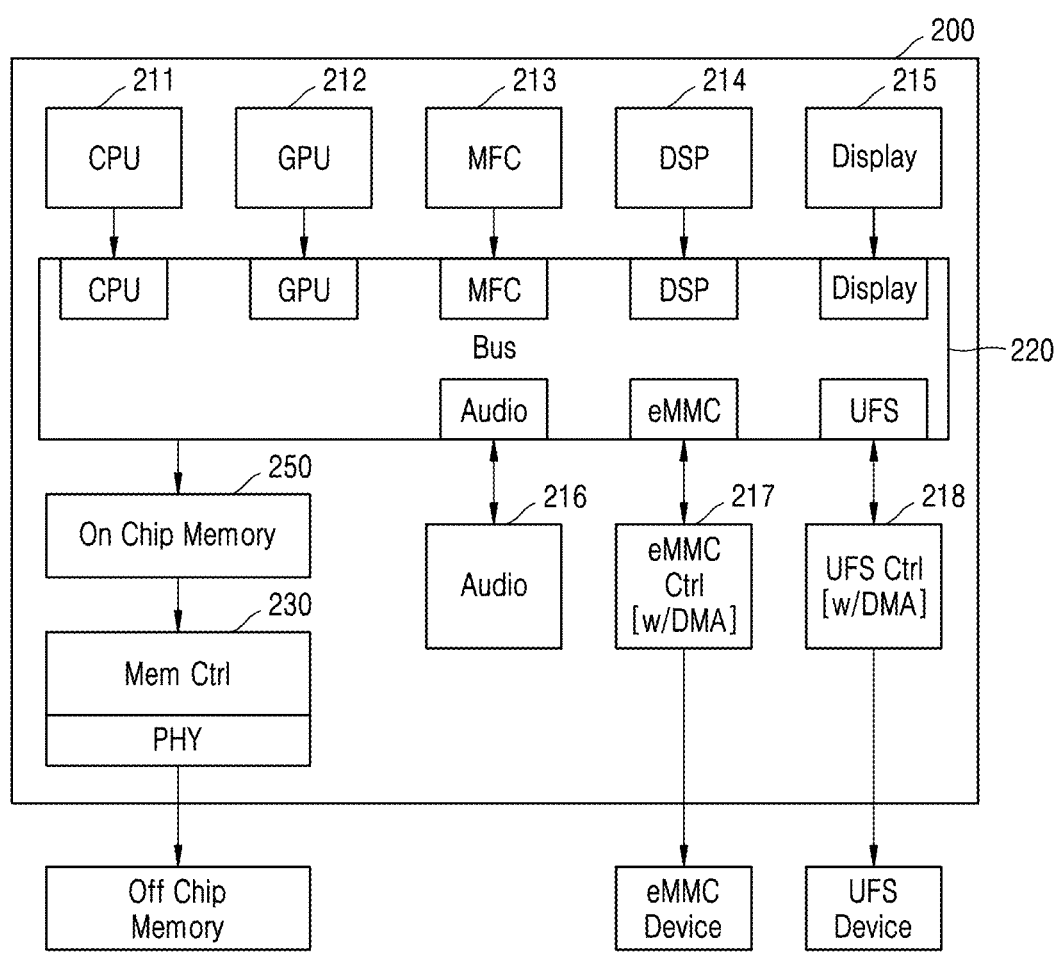
FIG. 1B is a block diagram illustrating a structure of a processor according to at least one example embodiment.

FIG. 1B is a block diagram illustrating the structure of the processor 200 according to at least one example embodiment in more detail. According to at least one example embodiment, the processor 200 of FIG. 1B may correspond to the processor 200 of FIG. 1A, but the example embodiments are not limited thereto.

Referring to FIG. 1B, the processor 200 according to at least one example embodiment may include an on chip memory 250, a memory controller 230, a plurality of master intellectual properties (IPs), e.g., IPs 211, 212, 213, 214, 215, 216, 217, and/or 218, etc., a second bus 220, and the like. In this case, the processor 200 may be an AP, but is not limited thereto. According to some example embodiments, one or more of the memory 250, the memory controller 230, the plurality of master intellectual properties (IPs) 211 to 218, the second bus 220, etc., may be implemented as processing circuitry. Processing circuitry may include hardware or hardware circuit including logic circuits; a hardware/software combination such as a processor executing software and/or firmware; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc., but is not limited thereto.

As illustrated, the processor 200 may be a system-on-chip (SoC) and may include various master intellectual property (IP) cores (e.g., also referred to as IP blocks and/or IPs). The IPs may be function and/or logic blocks (e.g., cores, cells, units, etc.) integrated in an integrated circuit of an electronic device. For example, the master IPs may include a CPU 211, a graphics processing unit (GPU) 212, a multi-format codec (MFC) 213, a digital signal processor (DSP) 214, a display 215, an audio device 216, an embedded multi-media card (eMMC) controller 217, a universal flash storage (UFS) controller 218, and the like. However, the example embodiments are not limited thereto, and the number and type of IPs may be variously changed. A detailed description of an operation of each of the master IPs is not directly related to the inventive concepts and is thus omitted.

The on chip memory 250 may be accessible by the master IPs, that is, the CPU 211, the GPU 212, the MFC 213, the DSP 214, the display 215, the audio device 216, the eMMC controller 217, and/or the UFS controller 218, etc. Although FIG. 1B illustrates only one on chip memory 250, various types of processors may be configured according to the example embodiments.

In addition, although FIG. 1B illustrates that the on chip memory 250 is located at a separate space in the processor 200, the example embodiments are not limited thereto. For example, although not illustrated, the on chip memory 250 may be implemented at various locations, for example, in the second bus 220 and/or in the memory controller 230, etc.

Referring to FIGS. 1A and 1B, an electronic device according to various example embodiments of the inventive concepts may include at least one SoC, the SoC may include at least one IP and a processor, and the processor may execute at least one program for generating test code capable of verifying the SoC, etc., but is not limited thereto.

Figure 1C:
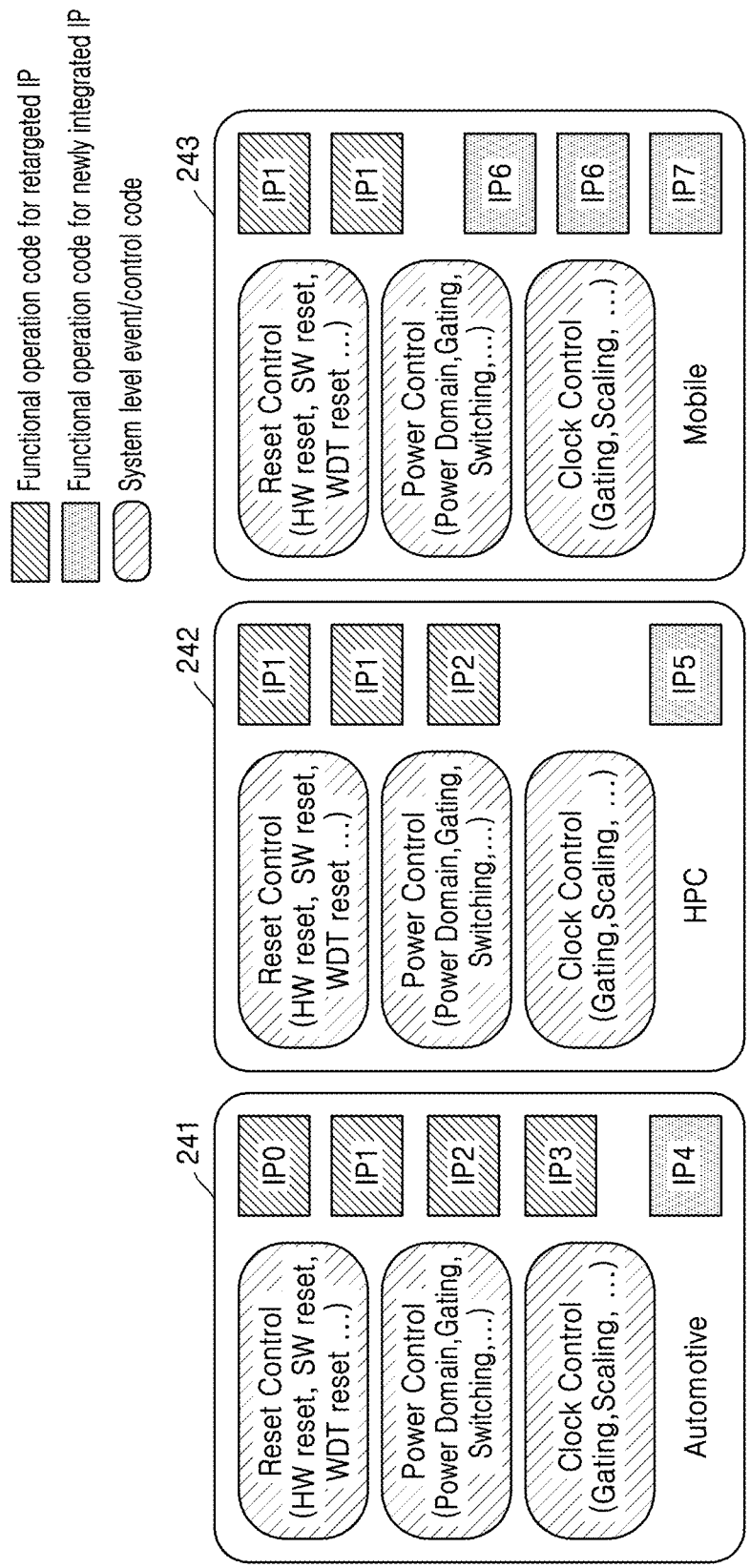
FIG. 1C is a block diagram illustrating codes that may be included in a plurality of system-on-chips (SoCs), according to at least one example embodiment.

FIG. 1C is a block diagram illustrating codes that may be included in a plurality of SoCs, according to at least one example embodiment.

Referring to FIG. 1C, a plurality of SoCs, e.g., first to third SoCs 241, 242, and/or 243, etc., may be provided, but the example embodiments are not limited thereto, and for example, the example embodiments may include a greater or lesser number of SoCs, etc. Each of the first to third SoCs 241, 242, and 243 may include one or more codes (e.g., software, firmware, and/or logic, etc.) for operating each of the first to third SoCs 241, 242, and/or 243, etc. Codes for operating SoCs may be classified into codes related to an IP, which is a functional block of an SoC, and codes related to driving an SoC, etc. In at least one example embodiment of the inventive concepts, codes related to a plurality of IPs included in an SoC are defined as sequence codes, and codes related to driving an SoC are defined as task codes. In at least one example embodiment of the inventive concepts, the terms "sequence code" and "sequence" may be used interchangeably, and the terms "task code" and "system event code" may be used interchangeably.

Referring to FIG. 1C, the first SoC 241 may include three task codes of reset control, power control, and clock control and five sequence codes of IP0, IP1, IP2, IP3, and IP4, but the example embodiments are not limited thereto. The second SoC 242 may include three task codes of reset control, power control, and clock control, and four sequence codes of IP1, IP1, IP2, and IP5, but the example embodiments are not limited thereto. The third SoC 243 may include three task codes of reset control, power control, and clock control and five sequence codes of IP1, IP1, IP6, IP6, and IP7, but the example embodiments are not limited thereto.

According to at least one example embodiment, the task codes may include reset control code, power control code, and clock control code, but are not limited thereto. The task codes may include codes respectively corresponding to a reset operation, a power operation, and a clock control operation for driving an SoC, etc. According to at least one example embodiment, the sequence codes may be codes respectively corresponding to functional blocks included in an SoC.

Referring to FIG. 1C, illustrated is an example in which identical sequence codes may be applied to identical functional blocks included in different SoCs, and task codes for driving different SoCs may all be equally applied. According to at least one example embodiment of the inventive concepts, the above sequence codes and task codes may be stored in a separate library (e.g., database, code database, etc.).

Figure 2:
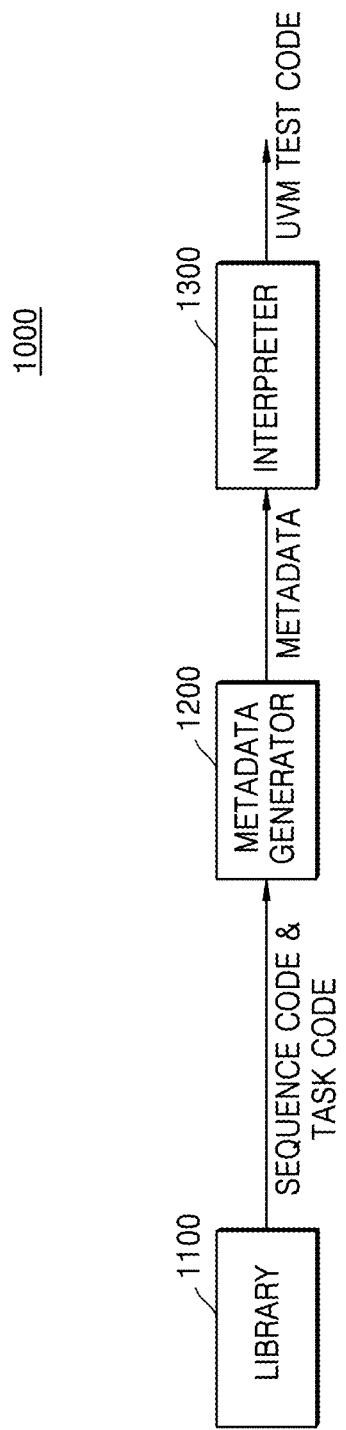
FIG. 2 is a block diagram illustrating a system for verifying an SoC, according to at least one example embodiment.

FIG. 2 is a block diagram illustrating a system 1000 for verifying an SoC, according to at least one example embodiment.

Referring to FIG. 2, the system 1000 for verifying an SoC may include a library 1100, a metadata generator 1200, and/or an interpreter 1300, etc., but the example embodiments are not limited thereto. The library 1100 may include a plurality of codes. The library 1100 may include a plurality of sequence codes and/or a plurality of task codes, but is not limited thereto. The library 1100 may store all of codes for driving an SoC to be verified, etc. According to at least one example embodiment, the library 1100 may be a universal verification methodology (UVM) library created according to and/or based on UVM object-oriented programming (OOP) characteristics, but the example embodiments are not limited thereto. A test scenario may be generated using the codes stored in the library 1100. This aspect is described below with reference to FIGS. 3 to 5B.

The metadata generator 1200 may generate at least one test scenario based on the sequence codes and/or the task codes stored in the library 1100, and may create the at least one test scenario in the form of metadata, but the example embodiments are not limited thereto. In at least one example embodiment of the inventive concepts, a test scenario may refer to a test scenario for verifying an SoC. In at least one example embodiment of the inventive concepts, a test scenario may refer to a scenario in which a plurality of IPs and execution orders of system events related to driving an SoC are set to verify the correct and/or normal operation of the SoC, etc. The test scenario may determine an order (e.g., verification order, test order, operation order, etc.) by combining a plurality of sequence codes corresponding to a plurality of IPs and task codes for driving an SoC, but is not limited thereto. The test scenario may determine orders of a plurality of codes in the form of at least one flowchart (e.g., verification flowchart, etc.).

The metadata generator 1200 may determine orders of the sequence codes and/or the task codes included in the test scenario. The metadata generator 1200 may determine orders of sequential execution, parallel execution, and/or sequential/parallel execution of the sequence codes and the task codes included in the test scenario. Determining orders may refer to defining orders of codes included in a test scenario to create the orders in the form of metadata, but is not limited thereto.

Based on the determined orders, the metadata generator 1200 may define each determined order by using separate desired and/or predefined operators (e.g., syntax operators, programming operators, logic operators, etc.). A result of applying the operators and orders may be output as metadata, but is not limited thereto. The metadata generator 1200 may generate metadata according to and/or based on rule definitions of symbols/numbers/characters, etc., that may be included in sequential/simultaneous/complex test scenarios. According to at least one example embodiment of the inventive concepts, the metadata may be defined as data containing information desired and/or necessary for configuring, for example, a testbench, etc., information on sequences and orders desired and/or required for verification, wherein numbers/symbols/characters for sequential/simultaneous/complex use of a plurality of sequence codes and a plurality of task codes for testing may be desired and/or predefined, but the example embodiments are not limited thereto. The metadata will be discussed in greater detail below with reference to FIGS. 7A and 7B.

The interpreter 1300 may read input metadata and then convert the metadata to generate (and/or automatically generate) and output UVM test code, etc., but is not limited thereto. The interpreter 1300 according to at least one example embodiment of the inventive concepts may generate (and/or automatically generate) classes and/or variable declarations conforming to the UVM syntax, settings/creations for class utilization, and the like. The interpreter 1300 will be discussed in greater detail below with reference to FIGS. 8 and 9.

According to at least one example embodiment of the inventive concepts, a test scenario may be generated and turned into metadata, and based on the metadata, UVM test code may be output and/or automatically output. As a result, there may be increased efficiency as manual creation and/or direct creation of UVM test code is not desired and/or required, and even a user unfamiliar with the UVM coding syntax may easily create UVM test code. In addition, because codes may be easily reused for overlapping system events and/or sequences, the number of resources (e.g., a license, a machine, etc.) desired and/or required for verification may be reduced. A detailed operation of a system for verifying an SoC is described below with reference to the following drawings.

Figure 3:
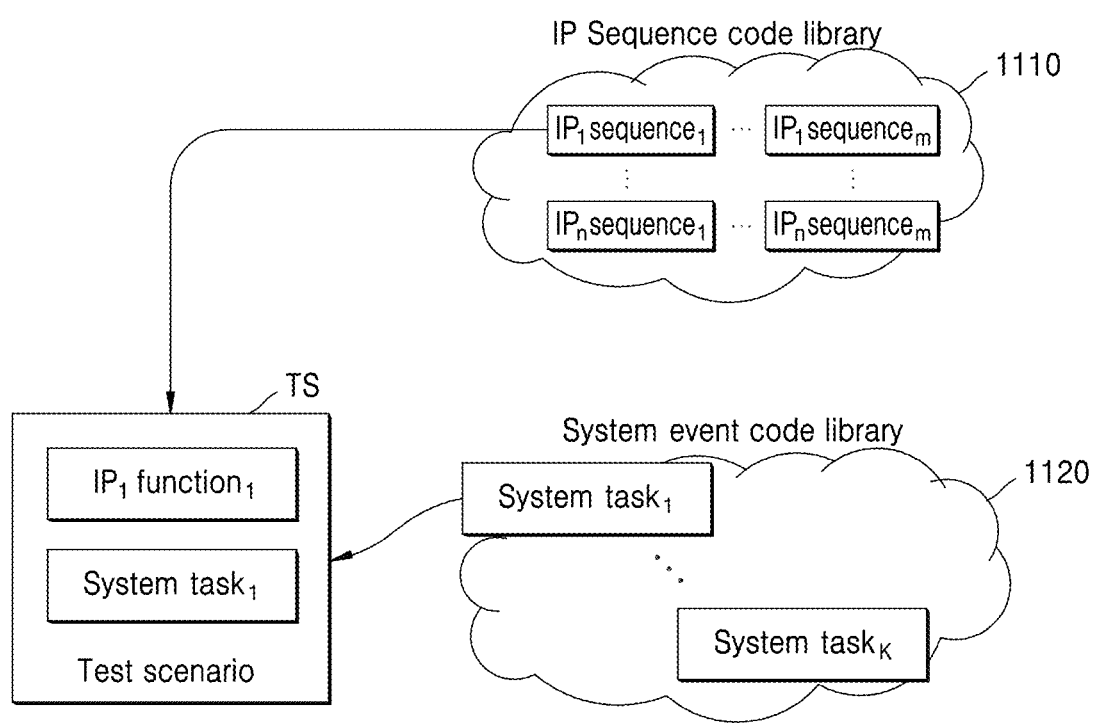
FIG. 3 is a diagram illustrating codes stored in a library and a test scenario, according to at least one example embodiment.

FIG. 3 is a diagram illustrating codes stored in a library and a test scenario, according to at least one example embodiment.

Referring to FIG. 3, an IP sequence code library 1110 and a system event code library 1120 are illustrated. The IP sequence code library 1110 and the system event code library 1120 may be included in the library 1100 of FIG. 2 but the example embodiments are not limited thereto, and other types of code may be stored in the library, etc. The IP sequence code library 1110 may include a plurality of sequence codes. The system event code library 1120 may include a plurality of task codes. The sequence codes included in the IP sequence code library 1110 according to at least one example embodiment may refer to sequence codes for driving respective IPs. As illustrated in FIG. 3, according to at least one example embodiment, a plurality of IPs may respectively include a plurality of sequence codes. According to at least one example embodiment, the sequence code may be a concept (and/or logic) corresponding to each IP, but is not limited thereto. According to at least one example embodiment, the sequence code may be a concept (and/or logic) corresponding to each of results of subdividing a plurality of features and/or operations included in an IP, but is not limited thereto. The task codes included in the system event code library 1120 according to at least one example embodiment may be task codes related to power on/off of an SoC and/or task codes for controlling a clock signal for driving an SoC, etc.

Referring to FIG. 3, a test scenario TS may be generated by combining the sequence codes and the task codes respectively included in the IP sequence code library 1110 and the system event code library 1120, but the example embodiments are not limited thereto.

Figure 4:
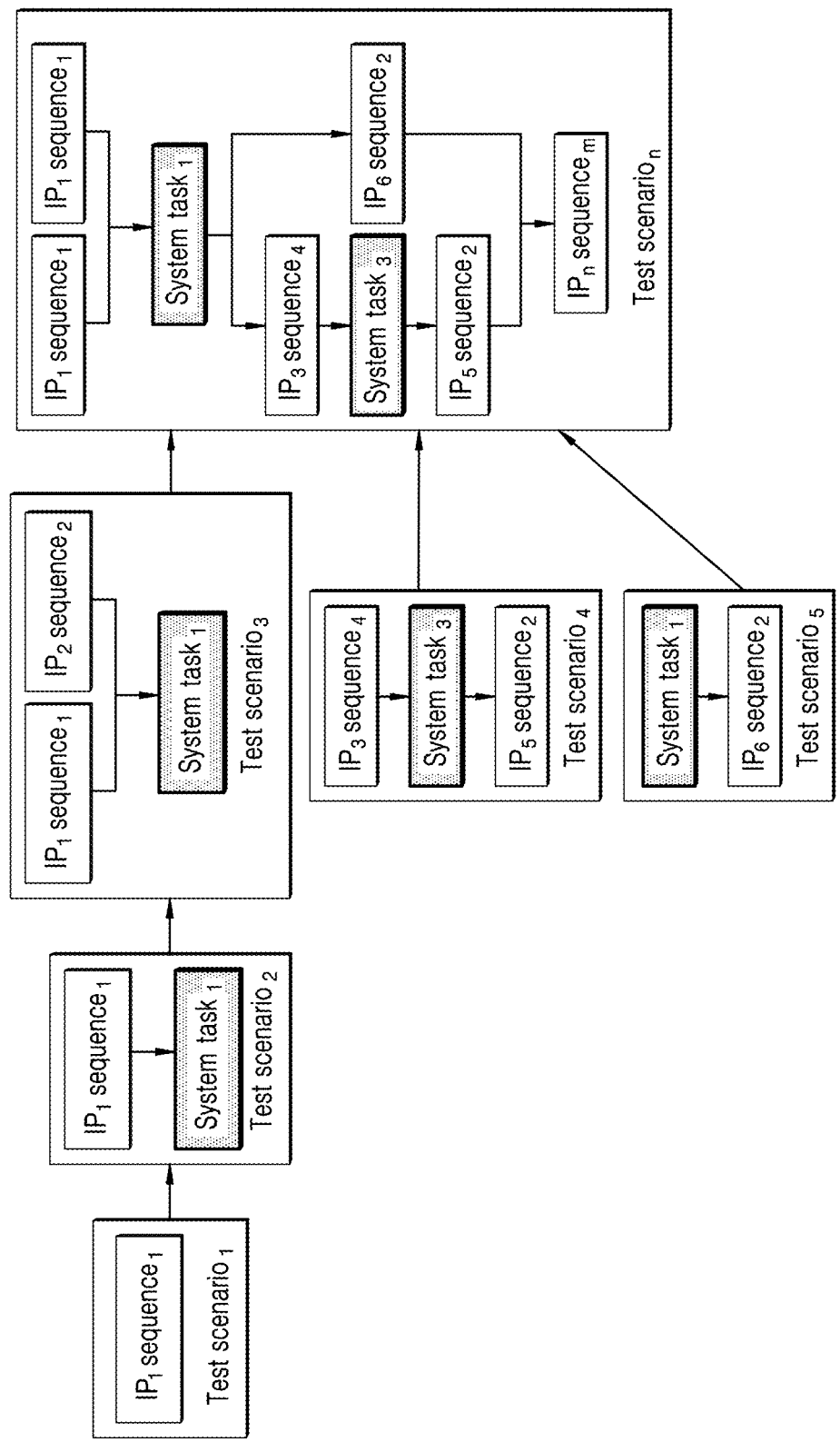
FIG. 4 is a diagram illustrating a process of generating a test scenario, according to at least one example embodiment.

FIG. 4 is a diagram illustrating a process of generating a test scenario, according to at least one example embodiment.

Referring to FIG. 4, a plurality of test scenarios are illustrated, but the example embodiments are not limited thereto. According to at least one example embodiment, in a first test scenario Test scenario$_1$, a first sequence code $IP_1$ sequence$_1$ of a first IP may be executed. In a second test scenario Test scenario$_2$, a first task code System task$_1$ may be executed following the first sequence code $IP_1$ sequence$_1$. In a third test scenario Test scenario$_3$, the first sequence code $IP_1$ sequence$_1$ of the first IP and a second sequence code $IP_2$ sequence$_2$ of a second IP may be executed in parallel, and then the first task code System task$_1$ may be executed. In a fourth test scenario Test scenario$_4$, a fourth sequence code $IP_3$ sequence$_4$ of a third IP, a third task code System task$_3$, and a second sequence code $IP_5$ sequence$_2$ of a fifth IP may be sequentially executed. In a fifth test scenario Test scenario$_5$, the first task code System task$_1$ may be executed, and a second sequence code $IP_6$ sequence$_2$ of a sixth IP may be sequentially executed. According to at least one example embodiment, an nth test scenario Test scenario$_n$ may be a scenario in which the third test scenario Test scenario$_3$, the fourth test scenario Test scenario$_4$, and the fifth test scenario Test scenario$_5$ are combined, but the example embodiments are not limited thereto.

As in the example embodiments shown in FIG. 4, test scenarios become increasingly complex, and as the test scenarios become more complex, it is difficult to create the test scenarios in UVM test code.

Figure 5A:
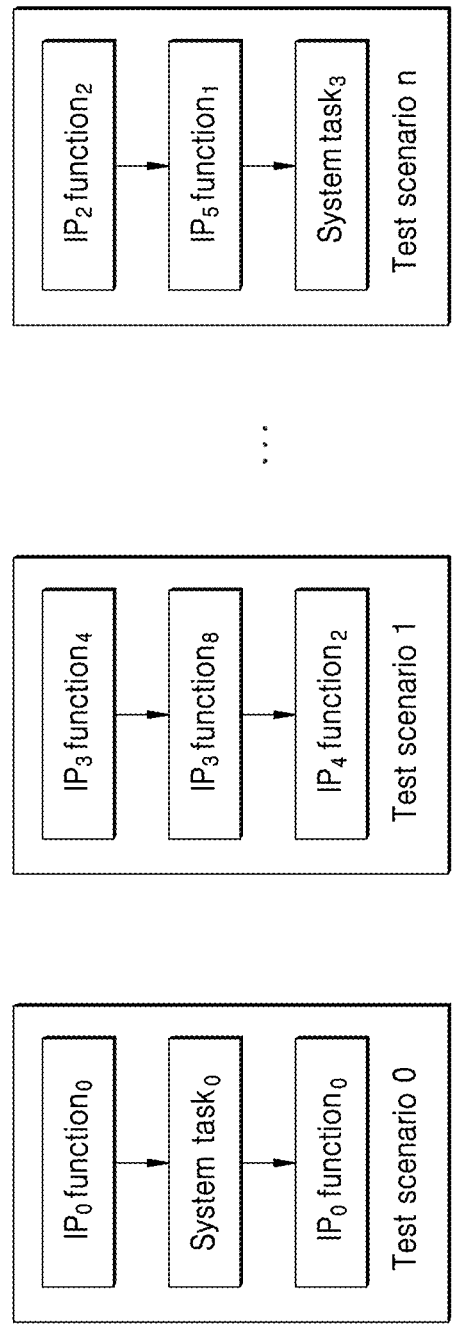
FIGS. 5A and 5B are diagrams illustrating a process of generating a test scenario, according to a comparative example, and a process of generating a test scenario, according to at least one example embodiment.
Figure 5B:
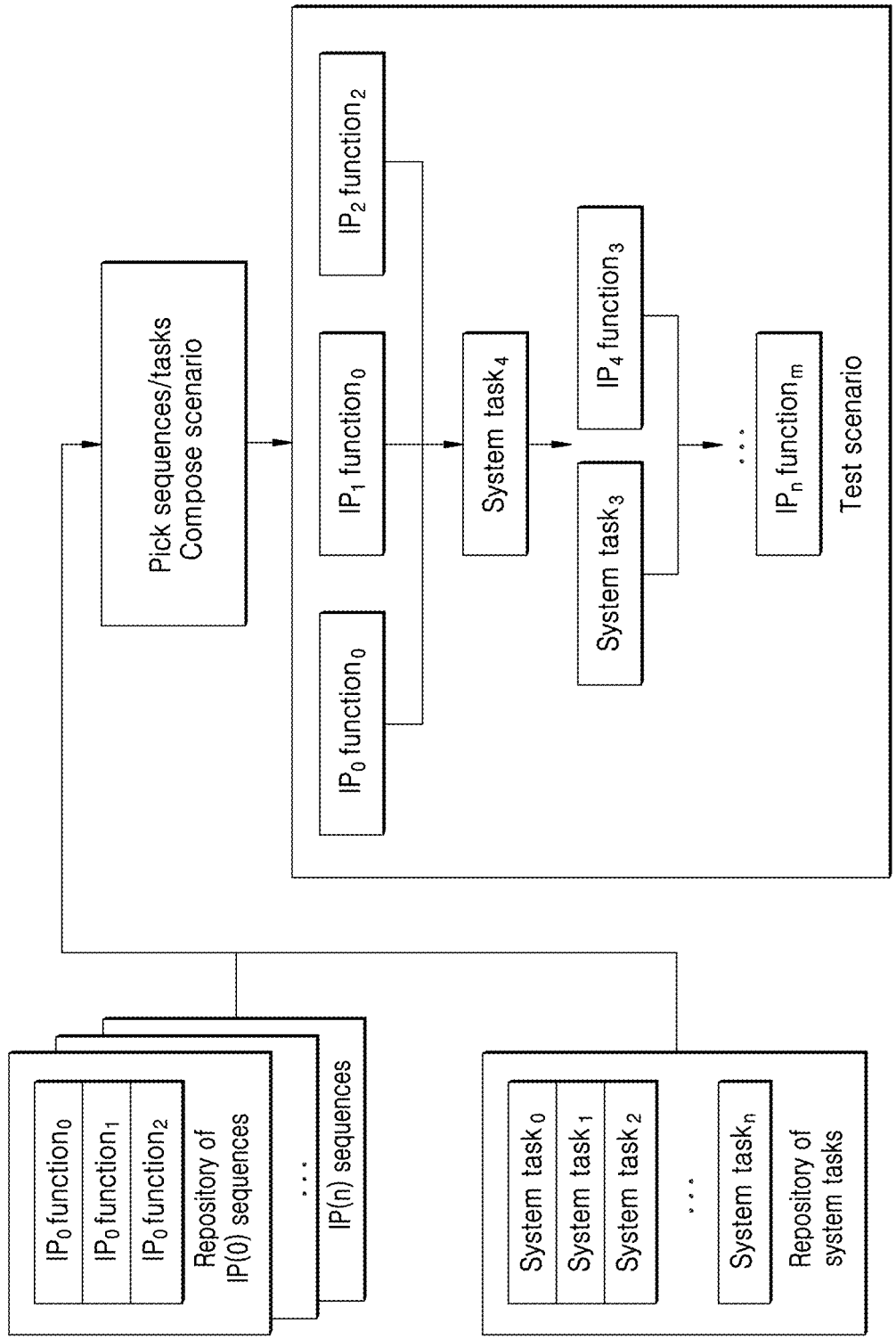

FIGS. 5A and 5B are diagrams illustrating a process of generating a test scenario, according to a comparative example, and a process of generating a test scenario, according to at least one example embodiment.

Referring to FIG. 5A, examples of test scenarios represented by a framework of three sequences operating in serial order are illustrated. Unlike a test scenario composed of only one sequence, a complex test scenario composed of multiple sequences may be developed using a framework.

A test scenario may be freely composed of a plurality of sequence codes and a plurality of task codes by using various IP functions and system tasks according to and/or based on IP test requirements. However, in the test scenarios according to the comparative embodiment of FIG. 5A, it is not possible to create a scenario in which four or more sequences or two or more sequences operate simultaneously. According to at least one example embodiment, an additional scenario framework is desired and/or required to develop a more complex test scenario and quickly meet a target scope of functional verification. As the number of verification entities and/or the complexity of a system increase, many combinations become possible, and thus, the number of test scenarios increases. Additionally, the number of test scenarios may not increase significantly if it is possible to create a well-structured scenario framework capable of handling many combinations of sequences at once. However, because operations of configuring a test scenario, generating a framework, and then inserting sequences thereinto still need to be performed, there may be a limitation in quickly reaching target coverage.

Referring to FIG. 5B, it is illustrated that more complex scenario code may be generated by variously combining sequence codes of a plurality of IPs and a plurality of task codes. According to at least one example embodiment of the inventive concepts, a test scenario may be easily created, more quickly created, and/or more efficiently created by storing sequence codes and task codes in a UVM library to which the UVM syntax is applied.

Figure 6:
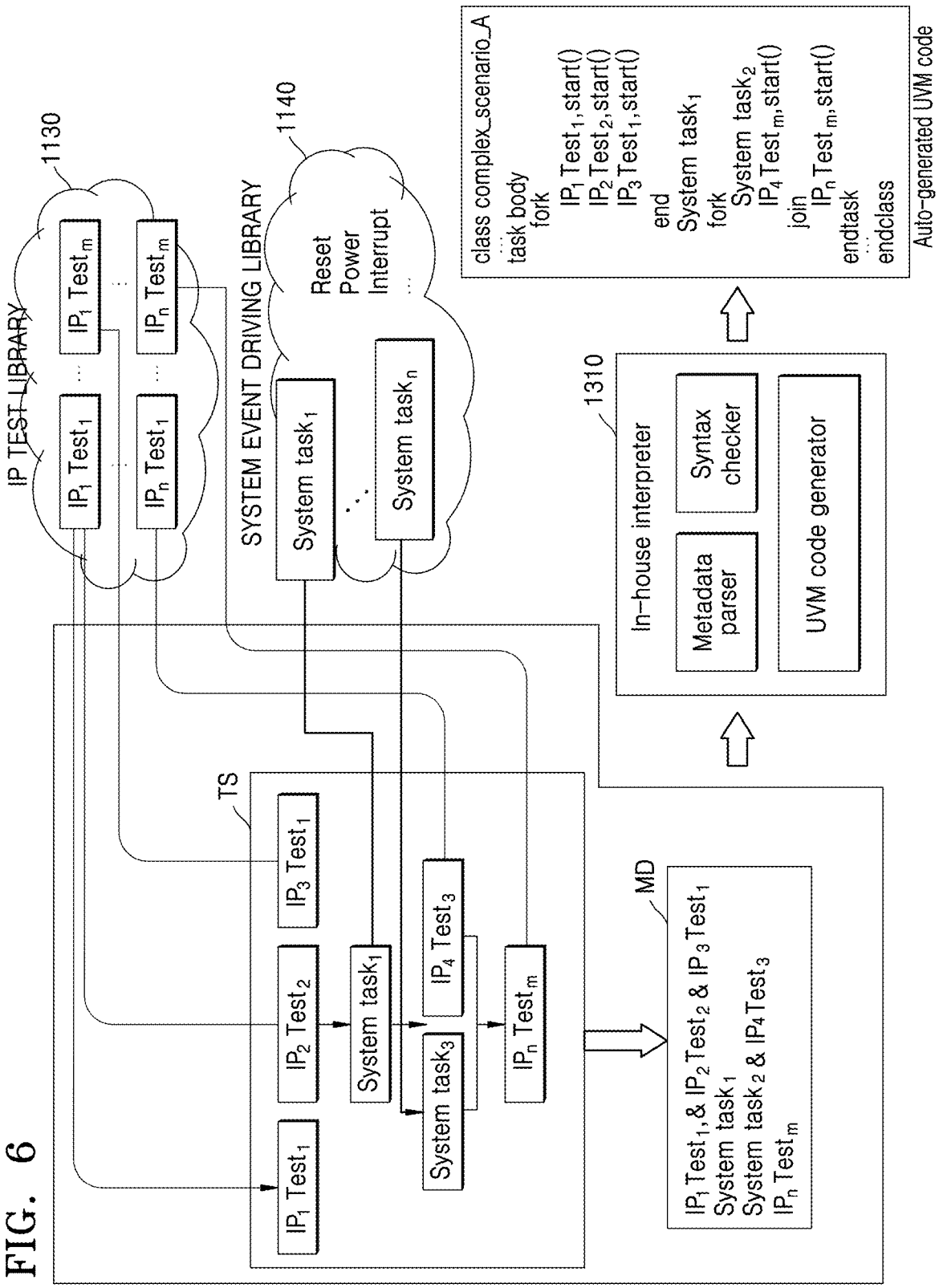
FIG. 6 illustrates an example of a process of generating a test scenario from a library, forming the test scenario into metadata, and converting the metadata into UVM code according to at least one example embodiment.

FIG. 6 illustrates an example of a process of generating at least one test scenario from a library, forming the test scenario into metadata, and converting the metadata into UVM code, but the example embodiments are not limited thereto.

Referring to FIG. 6, an IP test library 1130 and a system event driving library 1140 are illustrated, but the example embodiments are not limited thereto. In the IP test library 1130, sequence codes for tests respectively corresponding to a plurality of IPs may be stored. In the system event driving library 1140, task codes respectively corresponding to system events may be stored. According to at least one example embodiment, the IP test library 1130 and the system event driving library 1140 may be UVM libraries, but are not limited thereto. According to at least one example embodiment, the UVM library may be a library to which UVM-based codes are applied and/or stored, etc. That is, sequence codes and task codes stored in the UVM library may be codes to which the UVM syntax is at least partially applied, or in other words, the sequence codes and/or task codes may be written in UVM format, etc. According to at least one example embodiment of the inventive concepts, when composing test scenarios, tests including stimulus-based IP actions and/or system events, etc., may be implemented by using UVM-based codes, and test scenarios from a system perspective may be easily composed, more quickly composed, more efficiently composed, etc.

A test scenario TS may be generated by combining the sequence codes and/or the task codes stored in the IP test library 1130 and/or the system event driving library 1140, but is not limited thereto. The test scenario TS may be generated by appropriately combining a plurality of sequence codes and/or a plurality of task codes, etc. The test scenario TS may be created as various test scenarios by mixing and/or grouping some of the plurality of sequence codes and the plurality of task codes in a sequential and/or parallel manner.

When the test scenario TS is generated, orders of the plurality of sequence codes and/or the plurality of task codes included in the test scenario TS may be determined, and the determined orders may be formed into metadata MD by using desired and/or predefined operators. According to at least one example embodiment, the test scenario TS may be generated in the form of the metadata MD by using desired and/or predefined operators, for example, operators (e.g., syntax operators, etc.) such as "&" and ";", etc., but the example embodiments are not limited thereto. In the metadata MD, sequential, parallel, or sequential/parallel execution orders of target IPs and system events of the test scenario TS to be implemented may be defined using desired and/or predefined operators.

According to at least one example embodiment, the generation of the test scenario TS and the generation of the metadata MD may be performed by the metadata generator 1200 of FIG. 2, but is not limited thereto.

The generated metadata MD may be applied to, interpreted by, compiled by, and/or processed by an interpreter 1310 (e.g., a programming language interpreter, a compiler, etc.), but the example embodiments are not limited thereto. The interpreter 1310 may read the applied metadata MD, and according to and/or based on defined orders and combination methods of sequence codes and task codes, may generate and/or automatically generate class and/or variable declarations conforming to the UVM syntax, settings/creations for class utilization, and the like. As a result, UVM test code may be generated and simulated based on the output of the interpreter 1310, but the example embodiments are not limited thereto.

Each operation is described below in more detail with reference to the following drawings.

Figure 7A:
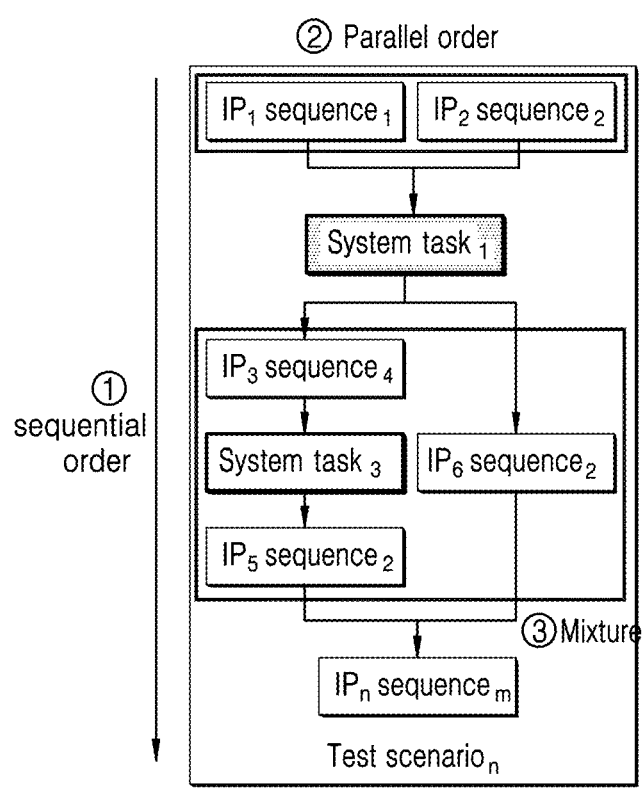
FIGS. 7A and 7B are diagrams illustrating a process of defining a test scenario in order by using operators to form the test scenario into metadata, according to at least one example embodiment.
Figure 7B:
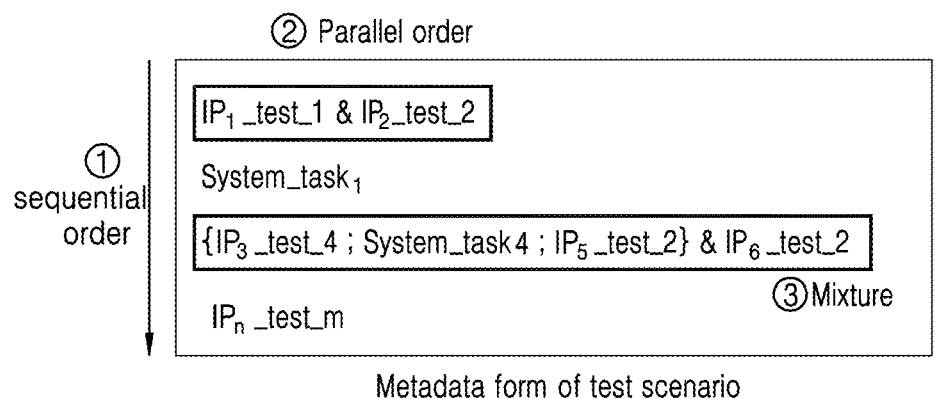

FIGS. 7A and 7B are diagrams illustrating a process of defining a test scenario in order by using operators to form the test scenario into metadata, according to at least one example embodiment.

FIG. 7A illustrates an example of a test scenario, and FIG. 7B illustrates an example in which the test scenario of FIG. 7A is formed into metadata, but the example embodiments are not limited thereto.

Referring to the test scenario of FIG. 7A, illustrated is a scenario in which a first sequence code $IP_1$ sequence$_1$ of a first IP and a second sequence code $IP_2$ sequence$_2$ of a second IP are executed in parallel, a first task code System task$_1$ is then executed, a fourth sequence code $IP_3$ sequence$_4$ of a third IP, a third task code System task$_3$, and a second sequence code $IP_5$ sequence$_2$ of a fifth IP are then sequentially executed, simultaneously and in parallel with execution of a second sequence code $IP_6$ sequence$_2$ of a sixth IP, and an $m^{th}$ sequence code $IP_n$ sequence$_m$ of an $n^{th}$ IP is then executed.

To create the form of the metadata of FIG. 7B, it is desired and/or necessary to define the test scenario by using desired and/or predefined operators. According to at least one example embodiment, parallel execution may be defined by an operator &. According to at least one example embodiment, sequential execution may be defined by line breaks. According to at least one example embodiment, sequential execution within one group may be defined by an operator. According to at least one example embodiment, one group may be defined by an operator { }. In at least one example embodiment of the inventive concepts, an operator may serve as a symbol for describing a sequence order, but the example embodiments are not limited thereto.

Referring to FIG. 7B, the parallel execution of the first sequence code $IP_1$ sequence$_1$ of the first IP and the second sequence code $IP_2$ sequence$_2$ of the second IP is created as IP1_test_1&IP2_test_2, but the example embodiments are not limited thereto. Then, after a line break, the sequential execution of the first task code System task1 is created as System_task_1. Then, after a line break, the sequential execution of the fourth sequence code $IP_3$ sequence$_4$ of the third IP, the third task code System task$_3$, and the second sequence code $IP_5$ sequence$_2$ of the fifth IP and the simultaneous and parallel execution of the second sequence code $IP_6$ sequence$_2$ of the sixth IP are created as {IP3_test_4; System_task_4; IP5_test_2;} & IP6_test_2. Then, after a line break, the execution of the $m^{th}$ sequence code $IP_n$ sequence$_m$ of the $n^{th}$ IP is created as IPn_test_m.

As described above, metadata may be formed by determining the ordering of sequence codes and/or task codes included in a test scenario and then defining sequential, parallel, and/or sequential/parallel execution orders thereof by using separate desired and/or predefined operators.

In at least one example embodiment, when composing and/or generating a test scenario for SoC verification, the test scenario may be expressed in three compositions of sequential execution, simultaneous execution, and/or simultaneous/sequential combination. Although three operators of &, { }, and ; are used in the example of FIG. 7B, all three operators may be substituted.

Figure 8:
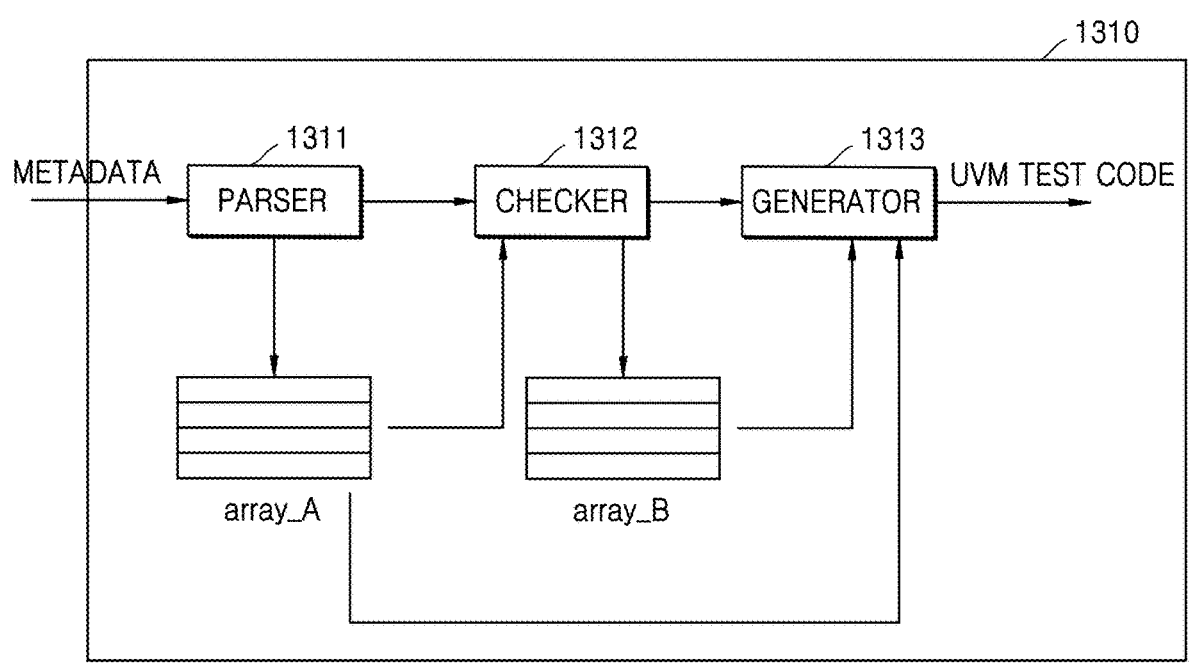
FIG. 8 is a diagram illustrating a process of converting metadata into UVM test code, according to at least one example embodiment.

FIG. 8 is a diagram illustrating a process of converting metadata into UVM test code, according to at least one example embodiment.

Referring to FIG. 8, the interpreter 1310 may include a parser 1311, a checker 1312, and/or a generator 1313, etc., but the example embodiments are not limited thereto. According to some example embodiments, one or more of the interpreter 1310, the parser 1311, the checker 1312, and/or the generator 1313, etc., may be implemented as processing circuitry. Processing circuitry may include hardware or hardware circuit including logic circuits; a hardware/software combination such as a processor executing software and/or firmware; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc., but is not limited thereto.

When metadata is input to the parser 1311, the parser 1311 may generate orders of sequences as a first array array_A by using and/or based on contents described in the input metadata, and may store the first array array_A in a memory (not illustrated), but the example embodiments are not limited thereto.

The checker 1312 may check and/or determined whether information contained in the first array array_A has syntax errors, logic errors, and/or other programming errors, etc. According to at least one example embodiment, the checker 1312 may check and/or determine whether the information contained in the first array array_A has no errors by using a Python 3 library function, but the example embodiments are not limited thereto. According to at least one example embodiment, the checker 1312 may check and/or determined whether there is an error based on a UVM class and/or UVM task recognition algorithm (hash function), but is not limited thereto. The checker 1312 may generate the checked data as a second array array_B and may store the newly generated second array array_B in a memory (not illustrated), but is not limited thereto.

In a subsequent operation, the generator 1313 may first generate a UVM test code framework based on the first array array_A and/or the second array array_B, etc., but is not limited thereto. This may be preliminary task for generating UVM test code. According to at least one example embodiment, the generator 1313 may first perform instance and create declarations for a UVM class contained in the second array array_B, etc., or in other words, the generator 1313 may generate at least one declaration for a UVM class based on the second array array_B, but the example embodiments are not limited thereto. This may be a variable declaration for the UVM class, etc. As a result, the UVM syntax may be applied, or in other words, UVM instances and/or declarations, etc. may be generated based on the second array array_B, etc., and/or the second array array_B may be interpreted, compiled, translated, etc., into UVM code, etc. The generator 1313 may then generate and/or automatically generate a sequence flowchart as UVM test code based on the first array array_A and store the UVM test code in a memory. This may be an object declaration for materializing variables declared for the UVM class, but is not limited thereto. The generated UVM test code may be used (e.g., executed, run, processed, etc.) and/or directly used for testing in a simulator (UVM simulator, SoC simulator, IP simulator, etc.) without any additional modification, but the example embodiments are not limited thereto.

Figure 9:
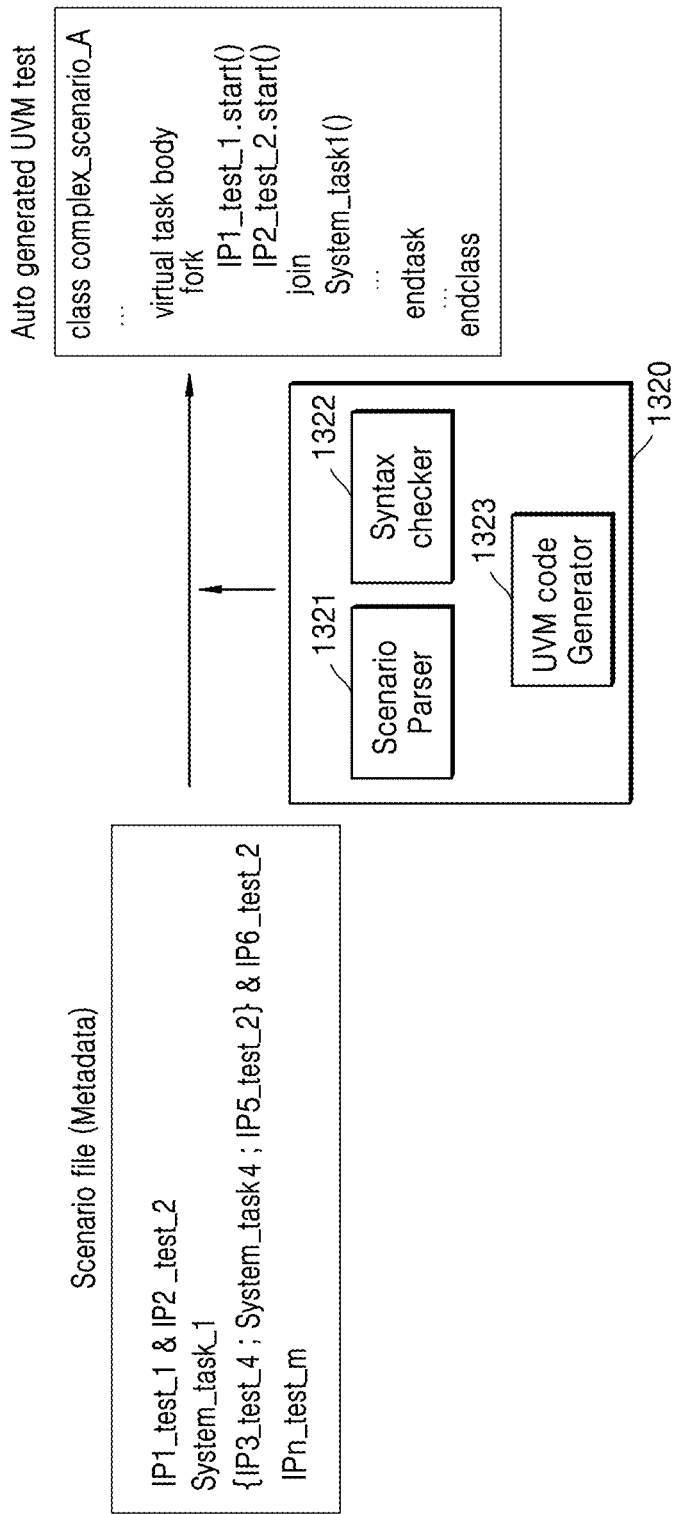
FIG. 9 is a diagram illustrating a result of converting metadata into UVM test code, according to at least one example embodiment.

FIG. 9 is a diagram illustrating a result of converting metadata into UVM test code, according to at least one example embodiment.

Referring to FIG. 9, an example of the metadata generated in FIG. 7B is illustrated, but the example embodiments are not limited thereto. The metadata may be generated and/or automatically generated as UVM test code through an interpreter 1320, but is not limited thereto. A scenario parser 1321 of FIG. 9 may correspond to the parser 1311 of FIG. 8, but the example embodiments are not limited thereto. A syntax checker 1322 of FIG. 9 may correspond to the checker 1312 of FIG. 8, but the example embodiments are not limited thereto. A UVM code generator 1323 of FIG. 9 may correspond to the generator 1313 of FIG. 8, but the example embodiments are not limited thereto. The generated and/or automatically generated UVM test code may be test code created according to and/or based on the UVM syntax, but the example embodiments are not limited thereto. The UVM test code illustrated in FIG. 9 shows an example in which sequence codes corresponding to IP_test_1 and IP_test_2 and a task code corresponding to System_task_1 have been created according to the UVM syntax, but the example embodiments are not limited thereto. Referring to the UVM test code illustrated in FIG. 9, a complex_scenario_A has been declared through a class, and by describing orders of sequences through a virtual task or endtask below the complex_scenario_A, the test code may be checked to determine whether the test code has been generated according to and/or based on the UVM syntax, etc. According to at least one example embodiment of the inventive concepts, UVM test code may be created and/or automatically created through metadata, etc.

According to at least one example embodiment of the inventive concepts, complex test scenarios may be easily generated and/or created using simple metadata, and as the barrier to entry for creating complex test scenarios is lowered, the dependence on individual skills of engineers may be reduced and the quality of a scenario may be improved through standardization, etc. In addition, because an interpreter generates and/or automatically generates UVM test code by using metadata as input, errors that may occur when an individual directly creates UVM test code may be reduced and/or prevented, etc.

Figure 10:
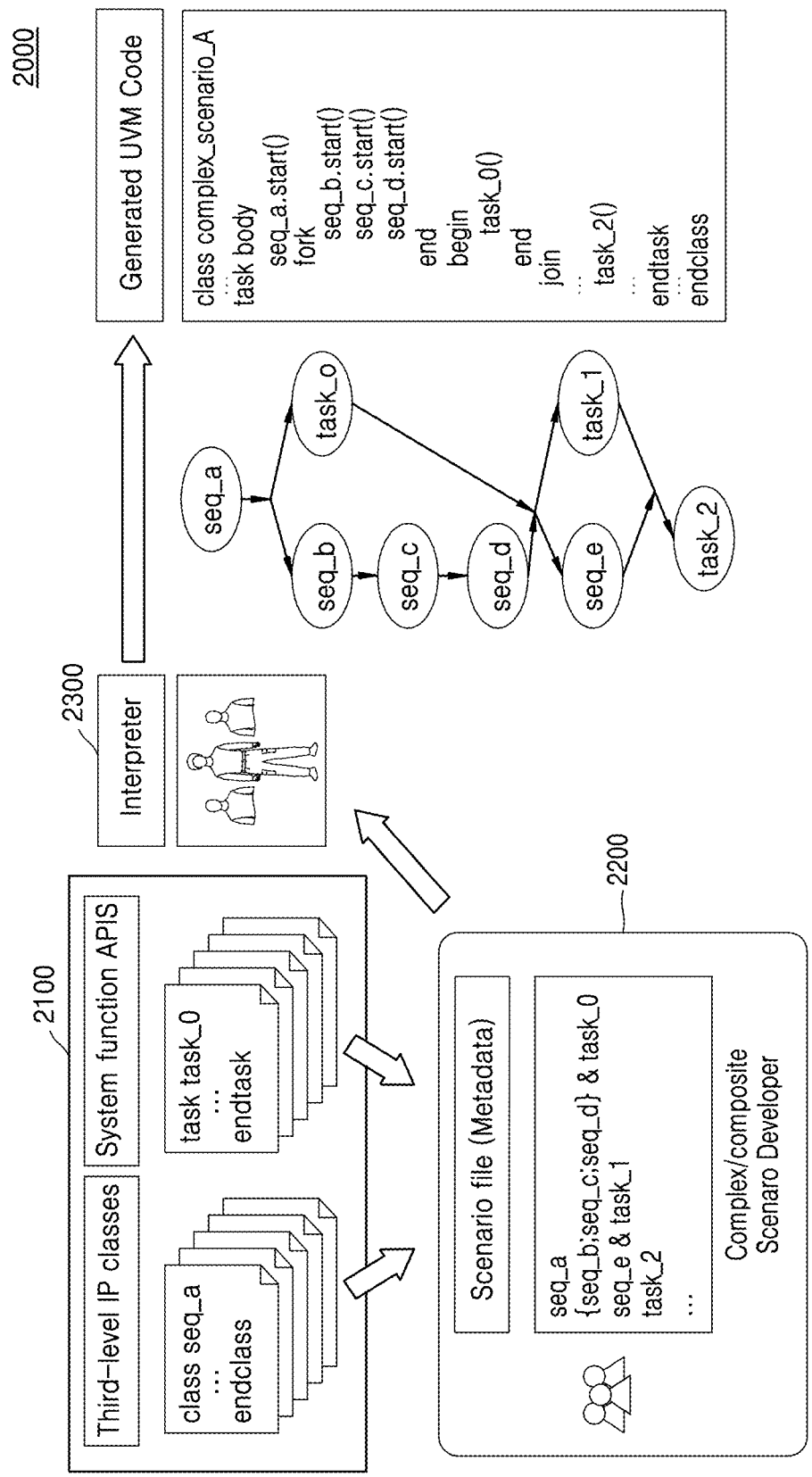
FIG. 10 is a diagram illustrating a system for verifying an SoC, according to at least one example embodiment.

FIG. 10 is a diagram illustrating a system 2000 for verifying an SoC, according to at least one example embodiment. The system 2000 for verifying an SoC illustrated in FIG. 10 may be an example of the system 1000 for verifying an SoC illustrated in FIG. 2, but the example embodiments are not limited thereto. The system 2000 for verifying an SoC according to at least one example embodiment of the inventive concepts may include a metadata generator 2200 that may generate a test scenario and/or metadata for determining orders of test sequences, and/or an interpreter 2300 that generates and/or automatically generates UVM test code, but the example embodiments are not limited thereto. According to at least one example embodiment, the interpreter 2300 may be developed based on Python 3, but the example embodiments are not limited thereto.

Referring to FIG. 10, the system 2000 for verifying an SoC according to at least one example embodiment includes a UVM library 2100, etc. The UVM library 2100 may store each sequence code and/or each task code, etc., but is not limited thereto. The metadata generator 2200 may generate a test scenario by using some of sequence codes and/or some of task codes included in the UVM library 2100. According to at least one example embodiment, when generating a test scenario, sequence codes and/or task codes described in text form are listed to determine orders of the sequence codes and/or the task codes, and metadata may be generated by applying operators for sequential execution, parallel execution, and/or simultaneous sequential/parallel execution.

A flowchart corresponding to the metadata generated by the metadata generator 2200 of FIG. 10 is illustrated at an output terminal of the interpreter 2300, but the example embodiments are not limited thereto. UVM test code finally output by the interpreter 2300 is also illustrated at the output terminal of the interpreter 2300, but the example embodiments are not limited thereto.

Referring to FIG. 10, although the metadata generated by the metadata generator 2200, the test scenario, and the UVM test code include the same and/or substantially the same information, there are differences in that the test scenario is expressed in the form of a flowchart by combining sequence codes and/or task codes described in text form, the metadata is data in which processing orders of the sequence codes and/or the task codes is defined using desired and/or pre-defined operators, and the UVM test code expresses the processing orders of the sequence codes and/or the task codes included in the metadata as test code having the UVM syntax.

Referring to FIG. 10, a metadata format including a sequence order may be generated by the metadata generator 2200, and the interpreter 2300 may read the metadata format and generate a framework accordingly, but the example embodiments are not limited thereto. For example, sequences seq_a, seq_b, seq_d, and seq_e may be selected from an IP library class, and task_0 and task_2 may be selected from a system event library, etc. Referring to FIG. 10, sequences seq_b, seq_c, and seq_d may be sequentially executed, and seq_e and task_1 may be simultaneously executed, but the example embodiments are not limited thereto. As described above, the metadata may be used to create and/or easily create a framework in any sequence order. The interpreter 2300 may generate a frame to conform to the UVM syntax, such as a class, a task, and a variable declaration, and then generate a test scenario according to the sequence order described in the metadata, but the example embodiments are not limited thereto.

The system 2000 for verifying an SoC according to at least one example embodiment of the inventive concepts may generate complex test scenarios including various system events, such as SoC reset, power on/off, clock signal, and/or interrupt occurrences, etc., but is not limited thereto. According to at least one example embodiment of the inventive concepts, because test scenarios that may be sequentially/simultaneously/compositely executed between system events and function blocks may be easily generated through metadata, SoC verification quality may be improved, and a verification turn-around time (TAT) may be shortened by reducing a test scenario creation time.

Figure 11:
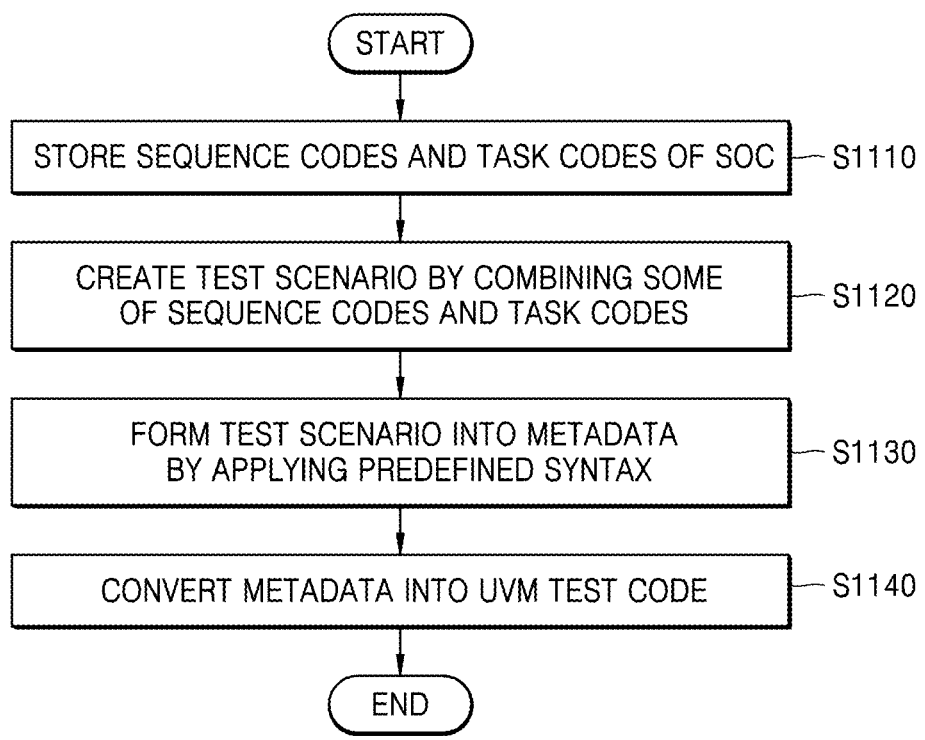
FIG. 11 is a flowchart illustrating a method of verifying an SoC, according to at least one example embodiment.

FIG. 11 is a flowchart illustrating a method of verifying an SoC, according to at least one example embodiment.

In operation S1110, processing circuitry executing for example, the metadata generator 2200 and/or the interpreter 2300, etc., may store the sequence codes and task codes of an SoC, but the example embodiments are not limited thereto. For example, the processing circuitry may store the sequence codes and the task codes in a UVM library, but is not limited thereto. For example, according to at least one example embodiment, the sequence codes and the task codes may be stored in different libraries, a database, etc.

In operation S1120, the processing circuitry may generate and/or create a test scenario by combining some of the sequence codes and/or the task codes, etc. According to at least one example embodiment, a test scenario capable of performing various operations may be created by variously combining execution orders of some of the sequence codes and/or the task codes, etc.

In operation S1130, the processing circuitry may generate, translate, and/or form the test scenario into metadata by applying a desired and/or predefined syntax, etc. According to at least one example embodiment, to order a flow included in the test scenario, metadata may be formed using desired and/or predefined operators, etc. According to at least one example embodiment, the desired and/or predefined operators may include &, ;, { }, and the like, but the operators are not limited thereto and may vary depending on new definitions and/or different programming language, etc.

In operation S1140, the processing circuitry may convert the metadata into UVM test code, etc. According to at least one example embodiment, when the metadata is input to the interpreter 1300 of FIG. 2, the interpreter 1300 may convert and/or automatically convert the metadata into UVM test code, but the example embodiments are not limited thereto.

According to at least one example embodiment, the method may be performed by a simulation platform including processing circuitry for verifying UVM-based SoC hardware, but is not limited thereto.

Figure 12:
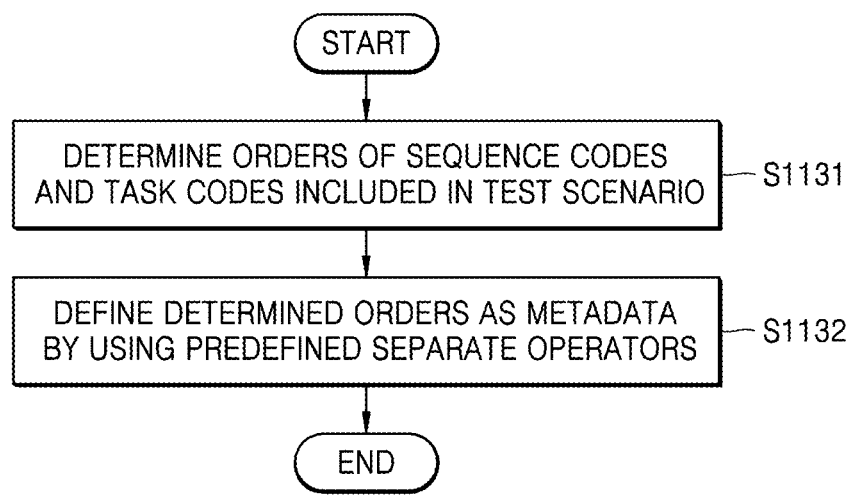
FIG. 12 is a flowchart illustrating a method of generating metadata, according to at least one example embodiment.

FIG. 12 is a flowchart illustrating a method of generating metadata, according to at least one example embodiment. The metadata generation method illustrated in FIG. 12 may be included in operation S1130 illustrated in FIG. 11, but the example embodiments are not limited thereto.

In operation S1131, processing circuitry executing, for example, the metadata generator 2200 and/or the interpreter 2300, etc., may determine the orders of the sequence codes and/or the task codes included in the test scenario, etc., but the example embodiments are not limited thereto. This may be an operation of checking an order (e.g., the sequencing, listing, etc.) of each sequence code and/or task code to convert the plurality of sequence codes and/or the plurality of task codes included in the test scenario into metadata, etc.

In operation S1132, the processing circuitry may convert, translate, and/or define the determined orders as metadata by using desired and/or predefined separate operators. According to at least one example embodiment, metadata may be generated according to desired and/or predefined rules by using separate desired and/or predefined operators.

Figure 13:
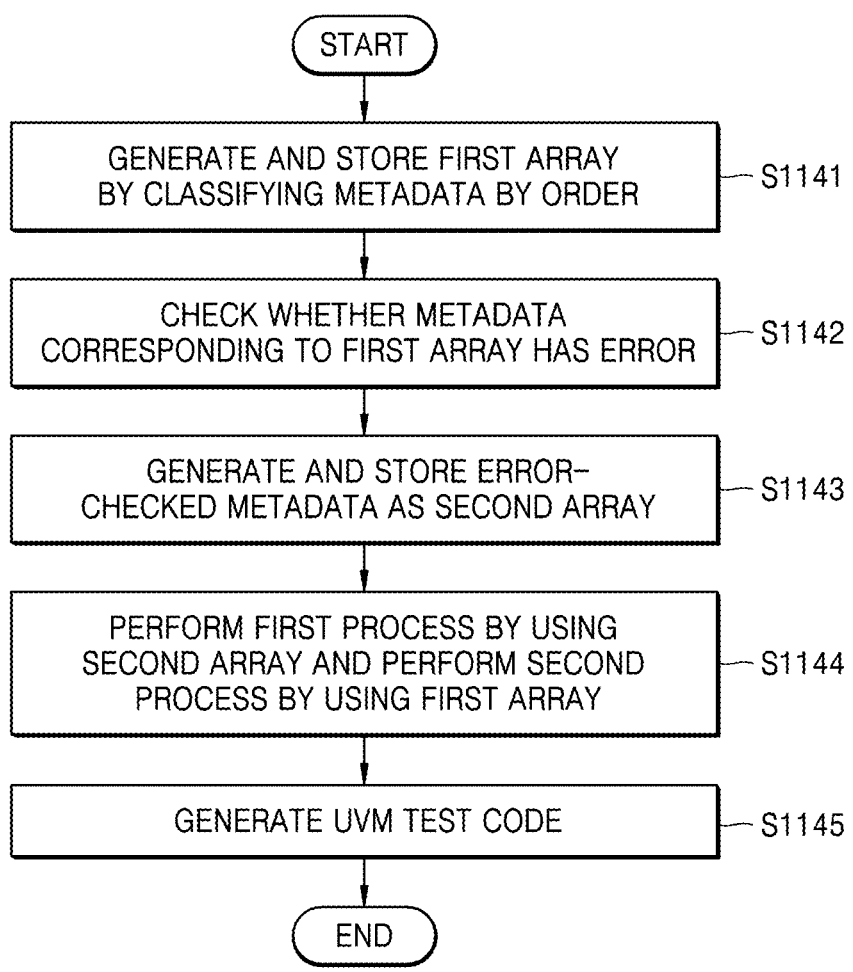
FIG. 13 is a flowchart illustrating a method of converting metadata into UVM test code, according to at least one example embodiment.

FIG. 13 is a flowchart illustrating a method of converting metadata into UVM test code, according to at least one example embodiment. The conversion method illustrated in FIG. 13 may be included in operation S1140 illustrated in FIG. 13, but the example embodiments are not limited thereto.

In operation S1141, processing circuitry executing, for example, the metadata generator 2200 and/or the interpreter 2300, etc., may classify the sequence codes and/or the task codes included in the defined metadata by execution order, may generate a first array based on the classified sequence codes and/or task codes, and may store the first array in a memory, but the example embodiments are not limited thereto.

In operation S1142, the processing circuitry may check and/or determine whether metadata stored in the first array has any errors, etc. According to at least one example embodiment, the processing circuitry may check for syntax errors, logic errors, etc., in the metadata, but is not limited thereto. According to at least one example embodiment, when there is an overlapping code in orders of the sequence codes and/or the task codes included in the metadata, the overlapping code may be an inoperable code. Thus, in the above case, the processing circuitry may report the presence of the error, and may regenerate and/or recreate the metadata, etc. When there is no syntax error in the metadata, operation S1143 may be performed.

In operation S1143, the processing circuitry may store the error-checked metadata, and may generate a second array based on the error-checked metadata, etc.

In operation S1144, the processing circuitry may perform a first process using the second array, and may perform a second process using the first array, etc., but the example embodiments are not limited thereto. According to at least one example embodiment, the first process may correspond to at least one preliminary task for generating UVM test code, and the second process may correspond to at least one task of completing the UVM test code considering and/or based on the orders of the sequence codes and/or the task codes defined in the metadata, etc., but the example embodiments are not limited thereto.

In operation S1145, the processing circuitry may generate UVM test code through the above processes, and the generated test code may be directly applied to a simulation (e.g., may be executed by a simulator, etc.), but the example embodiments are not limited thereto.

While various example embodiments of the inventive concepts have been particularly shown and described, it will be understood that various changes in form and details may be made therein without departing from the spirit and scope of the following claims.

What is claimed is:

1. A system for verifying a system-on-chip (SoC) comprising a plurality of intellectual property cores (IPs), the system comprising:
 a library configured to store a plurality of sequence codes corresponding to operations performable by each of the plurality of IPs and a plurality of task codes associated with system functions for driving the SoC; and
 processing circuitry configured to,
  analyze the plurality of sequence codes and the plurality of task codes corresponding to the plurality of IPs included in the SoC,
  generate at least one test scenario by combining one or more of the sequence codes and one or more of the task codes stored in the library based on results of the analysis,
  generate metadata based on the at least one test scenario, the metadata having a specific format, and
  generate universal verification methodology (UVM) test code based on the metadata.

2. The system of claim 1, wherein the processing circuitry is further configured to:
 determine a test sequence order for the one or more sequence codes and the one or more task codes included in the test scenario.

3. The system of claim 2, wherein the processing circuitry is further configured to determine the test sequence order by:
 determining sequential, parallel, or sequential/parallel execution orders of the one or more sequence codes and the one or more task codes included in the test scenario.

4. The system of claim 3, wherein the processing circuitry is further configured to:
 define the sequential, parallel, or sequential/parallel execution orders of the one or more sequence codes and the one or more task codes using separate desired operators.

5. The system of claim 1, wherein the metadata having the specific format comprises data in which processing orders of the one or more sequence codes and the one or more task codes included in the test scenario are defined using desired operators.

6. The system of claim 1, wherein the processing circuitry is further configured to:
 generate a first array by classifying the one or more sequence codes and the one or more task codes included in the metadata by execution order;
 check the metadata stored in the first array for errors;
 generate a second array based on the error-checked metadata; and
 generate the second array as a scenario conforming to UVM syntax.

7. The system of claim 6, wherein the processing circuitry is further configured to:
 generate a framework of the UVM test code based on the first array and the second array;
 perform instance and create declarations based on a class stored in the second array; and
 generate the UVM test code based on the execution order stored in the first array.

8. A method, performed by at least one processor by executing a program, of verifying an system-on-chip (SoC), the method comprising:
 analyzing a plurality of sequence codes and a plurality of task codes corresponding to a plurality of intellectual property cores (IPs) included in the SoC, the plurality of sequence codes corresponding to operations performable by each of the IPs included in the SoC, and the plurality of task codes associated with system functions for operation of the SoC;
 generating at least one test scenario corresponding to the plurality of IPs included in the SoC by combining one or more sequence codes of the plurality of sequence codes and one or more task codes of the plurality of task codes based on results of the analyzing;
 forming metadata based on the test scenario by applying a desired syntax to the at least one test scenario;

generating universal verification methodology (UVM) test code based on the metadata; and outputting the UVM test code.

9. The method of claim 8, wherein the generating of the test scenario comprises:

generating the test scenario based on characteristics of the IPs included in the SoC and system events of the SoC to be verified.

10. The method of claim 8, wherein the forming of the test scenario into the metadata comprises:

determining a testing sequence order of the one or more sequence codes and the one or more task codes included in the test scenario.

11. The method of claim 10, wherein the forming of the test scenario into the metadata comprises:

defining the order of the one or more sequence codes and the one or more task codes included in the test scenario using desired separate operators.

12. The method of claim 11, wherein the desired separate operators comprise:

a first operator used when the one or more sequence codes and the one or more task codes are sequentially executed;

a second operator used when the one or more sequence codes and the one or more task codes are executed in parallel; and a third operator used when the one or more sequence codes and the one or more task codes are executed in groups.

13. The method of claim 8, wherein the generating the UVM test code comprises:

classifying the one or more sequence codes and the one or more task codes included in the metadata by order; and generating a first array based on results of the classifying.

14. The method of claim 13, wherein the generating the UVM test code comprises:

checking whether data stored in the first array is duplicated; and generating a second array based on the first array and results of the checking.

15. The method of claim 14, wherein the generating the UVM test code comprises:

generating a framework of the UVM test code based on the first array and the second array;

declaring variables for performing UVM processing based on the second array; and performing an object declaration based on the declared variables.

16. The method of claim 15, wherein the declaring the variables for performing the UVM processing includes declaring the variables based on information stored in the second array; and the performing the object declaration includes performing the object declaration based on information stored in the first array.

17. A non-transitory computer-readable storage medium having stored thereon computer readable instructions, wherein the computer readable instructions, when executed by at least one processor, causes the at least one processor to:

analyze a plurality of sequence codes and a plurality of task codes corresponding to a plurality of intellectual property cores (IPs) included in a system-on-chip (SoC), the plurality of sequence codes corresponding to operations performable by each of the IPs included in the SoC, and the plurality of task codes associated with system functions for operation of the SoC;

generate at least one test scenario corresponding to the plurality of IPs included in the SoC based on one or more sequence codes and one or more task codes of the plurality of task codes based on results of the analysis;

form metadata based on the at least one test scenario by applying a desired syntax;

generate universal verification methodology (UVM) test code based on the metadata; and output the UVM test code.

18. The non-transitory computer-readable storage medium of claim 17, wherein the at least one processor is further caused to perform the forming the metadata by:

defining a testing sequence order of the one or more sequence codes and the one or more task codes included in the at least one test scenario using desired separate operators.

19. The non-transitory computer-readable storage medium of claim 17, wherein the at least one processor is further caused to perform the generating the UVM test code by:

classifying the one or more sequence codes and the one or more task codes included in the metadata by order;

generating a first array based on results of the classification;

checking whether data stored in the first array is duplicated; and generating a second array based on the first array and results of the checking.

20. The non-transitory computer-readable storage medium of claim 19, wherein the at least one processor is further caused to perform the generating the UVM test code by:

generating a framework of the UVM test code based on the first array and the second array;

declaring variables for UVM processing based on the second array; and performing an object declaration for materializing the declared variables based on the first array.

* * * * *